United States Patent
Branham et al.

[11] 3,752,207
[45] Aug. 14, 1973

[54] METHOD AND APPARATUS FOR STABILIZING

[76] Inventors: Norvel R. Branham, 2312 Armand Rd., N.E.; Peter C. Pantaze, 2378 Johnson Rd., N.E., both of Atlanta, Ga.

[22] Filed: Apr. 5, 1971

[21] Appl. No.: 131,506

Related U.S. Application Data

[63] Continuation of Ser. No. 803,030, Feb. 27, 1969, abandoned.

[52] U.S. Cl. .................................................. 157/13
[51] Int. Cl. ............................................. B29h 21/01
[58] Field of Search ...................................... 157/13

[56] References Cited
UNITED STATES PATENTS
2,918,116   12/1959   Mooney .............................. 157/13
3,354,929   11/1967   French ............................... 157/13

*Primary Examiner*—Granville Y. Custer, Jr.
*Attorney*—Newton, Hopkins & Ormsby

[57] ABSTRACT

A method of and apparatus for stabilizing a vehicular wheel and tire assembly rotatable about an axis and having a circumferential tread which rolls along a surface wherein the method comprises the steps of rotating the wheel and tire assembly while simultaneously determining the radial deviations of the tread with respect to the axis at two or more points along a line across the tread parallel to the axis and rotating about the circumference of the wheel and tire assembly; correlating the determinations thus taken to indicate the curvature of the tread across its width and the irregularity of the tread produced by lateral runout, radial runout or a combination thereof; and subsequently cutting away portions of the tread to redefine the tread so that the irregularity of the tread is substantially eliminated and the curvature of the tread across its width remains the same.

The apparatus includes an indicator mechanism, a cutter assembly and a control unit which mounts the indicator mechanism and cutter assembly adjacent the wheel and tire assembly. The indicator mechanism includes one indicator for measuring the radial runout along one edge of the tread, another indicator for measuring the radial runout along the opposite edge of the tread; and means for correlating the indicators to indicate the deviation of the radii across the tread. Another indicator may be provided for correlation with one of the above indicators to indicate the curvature of the tread across its width. The cutter assembly includes a cutter and the control unit includes guide means for controlling the cutter assembly.

12 Claims, 19 Drawing Figures

Patented Aug. 14, 1973

INVENTORS
NORVEL R. BRANHAM
PETER C. PANTAZE
BY
Newton, Hopkin
& Ormsby
Attorneys Patented Aug. 14, 1973

INVENTORS
NORVEL R. BRANHAM
PETER C. PANTAZE

BY *Newton, Hopkins & Ormsby*
  *Attorneys*

INVENTORS
NORVEL R. BRANHAM
PETER C. PANTAZE

BY Newton, Hopkins, & Ormsby
Attorneys

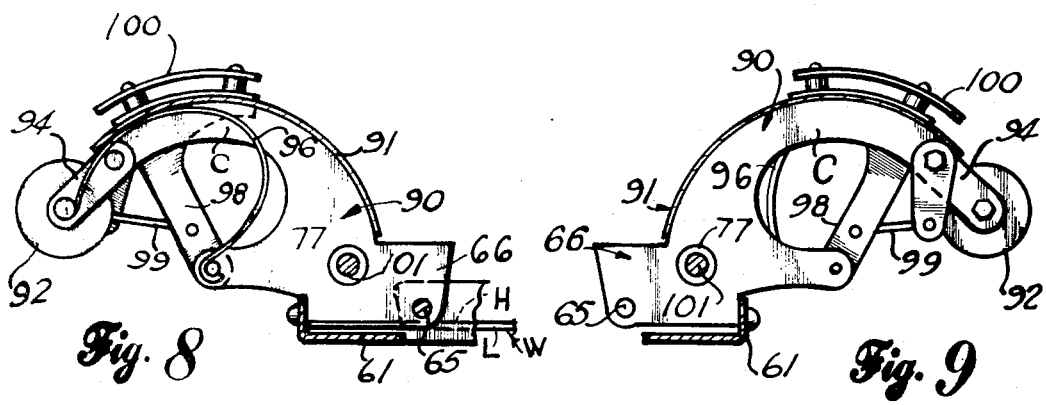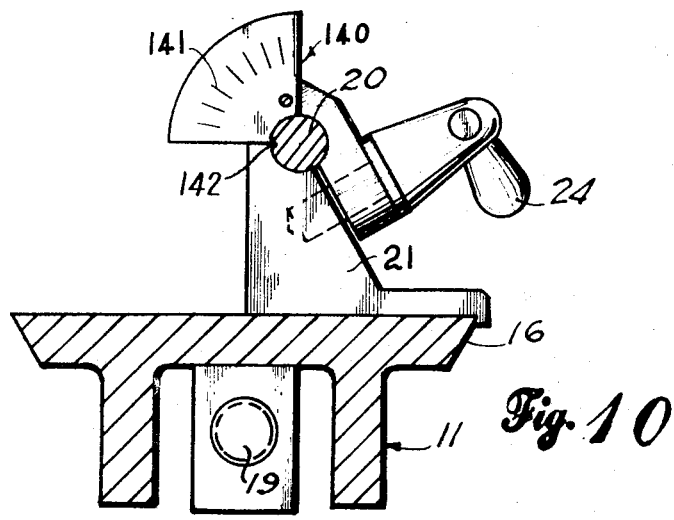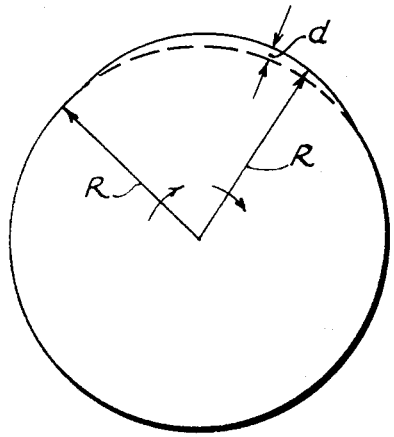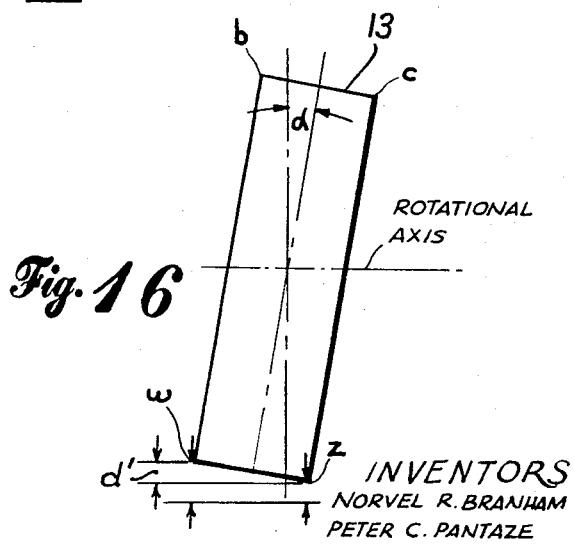

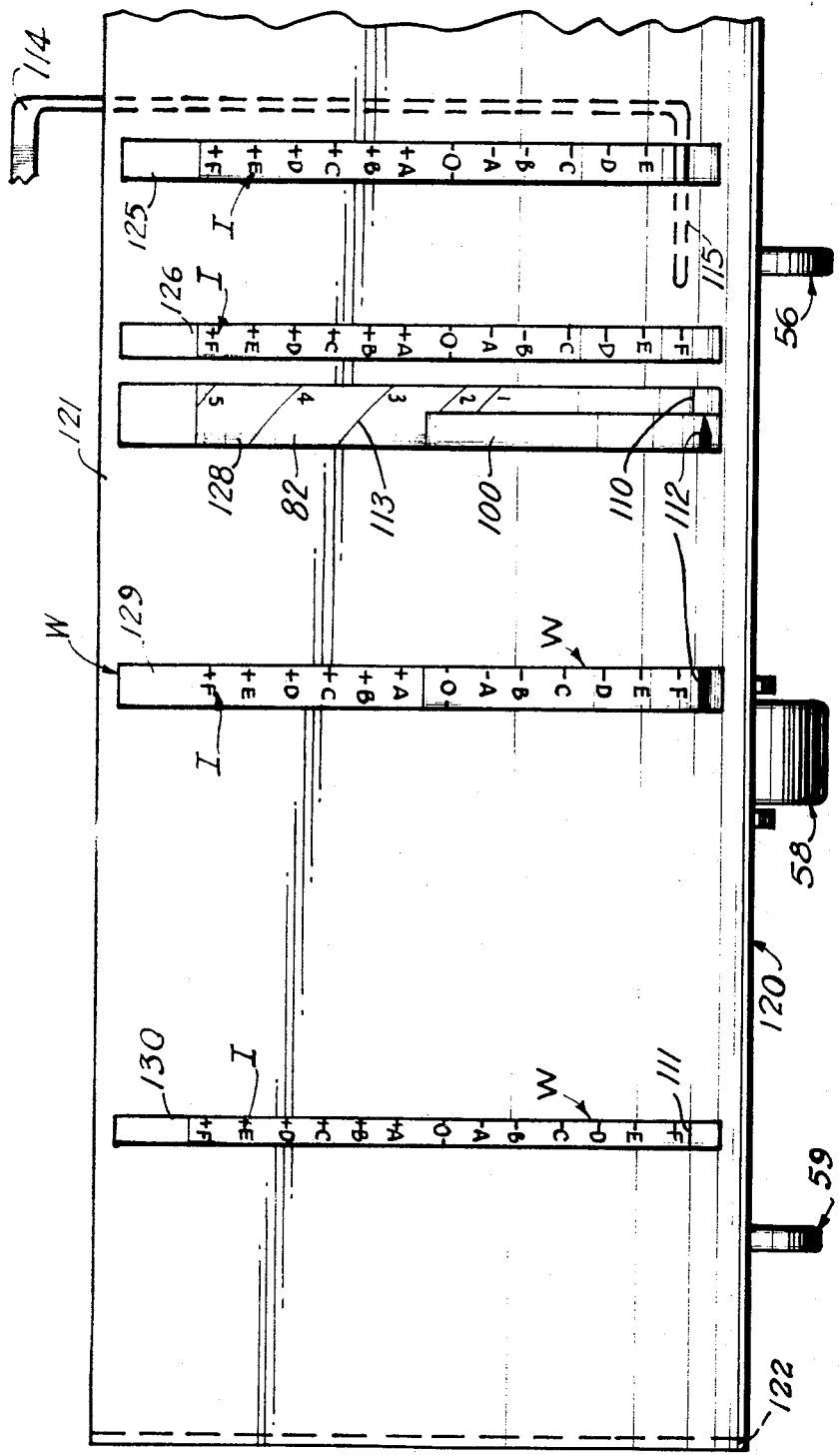

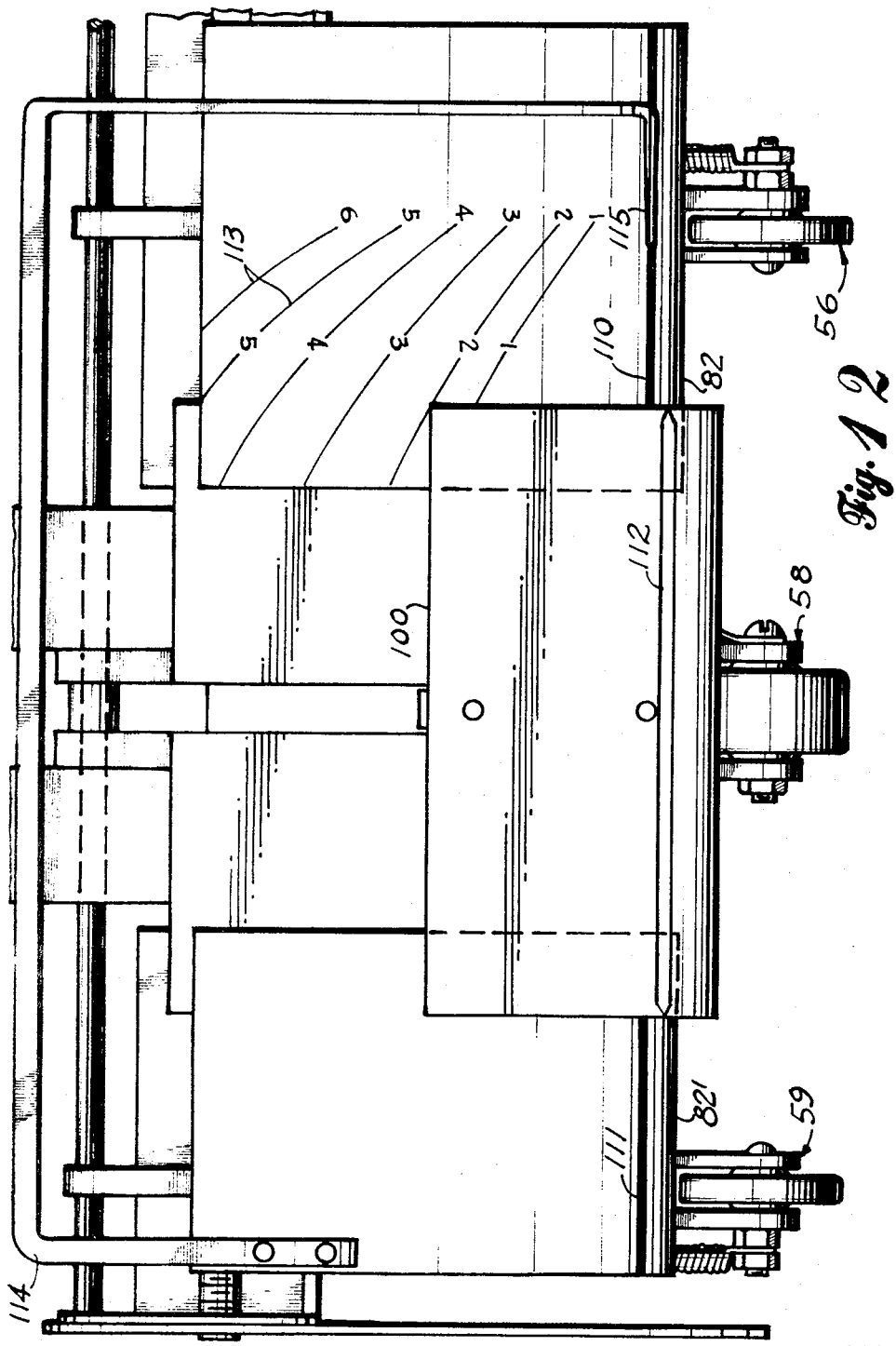

Patented Aug. 14, 1973 3,752,207
7 Sheets-Sheet 7
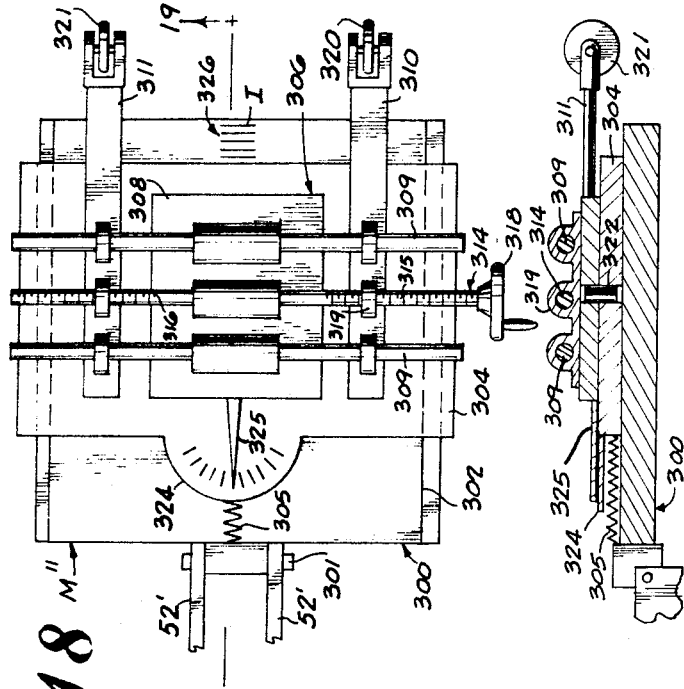
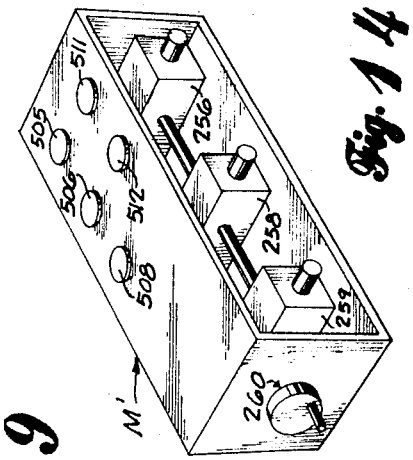
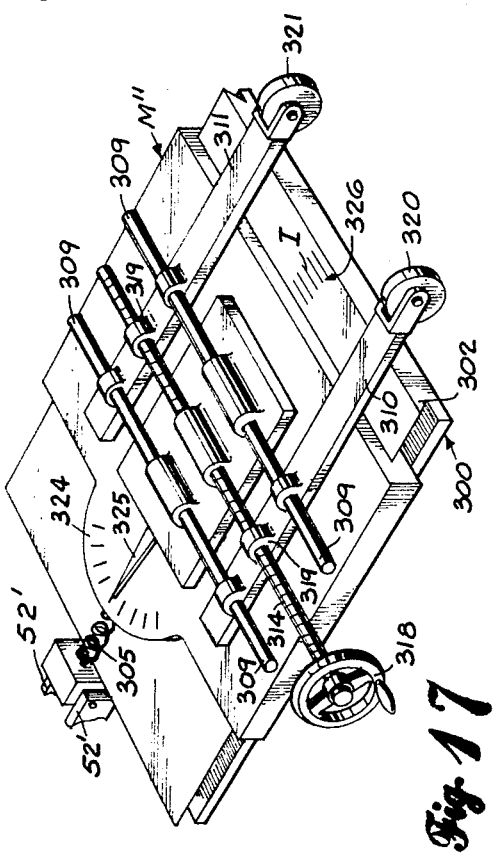
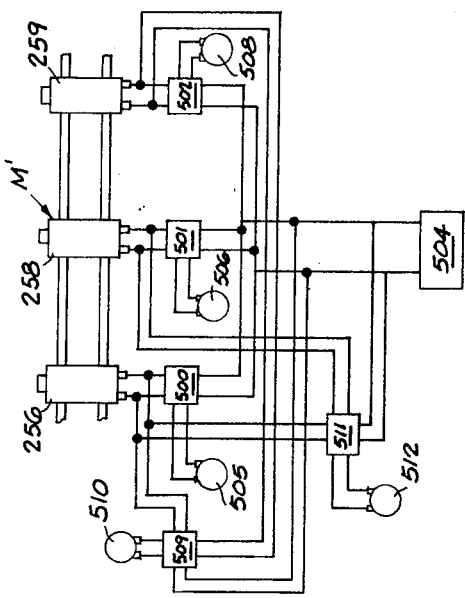
INVENTORS.
NORVEL R. BRANHAM
PETER C. PANTAZE
BY: *Newton, Hopkins, & Ormsby*
*Attorneys*

METHOD AND APPARATUS FOR STABILIZING

This is a continuation of Application, Ser. No. 803,030, filed Feb. 27, 1969, and now abandoned.

BACKGROUND OF THE INVENTION

1. Field of the Invention

This invention relates generally to a method of an apparatus for stabilizing a vehicular wheel and tire assembly rotatable about an axis and having a circumferential tread which rolls along a surface and more particularly to a method of and apparatus for stabilizing a vehicular wheel and tire assembly by substantially eliminating the effects of both radial runout and lateral runout.

2. Discussion of the Prior Art

Commercially available vehicular wheel and tire assemblies normally have what is known in the trade as radial and lateral runout. Radial runout is defined generally as the radial deviations between the tread of the tire and the axis about which it rotates, and lateral runout is defined generally by the amount of displacement of the tread from a plane perpendicular to the effective axis about which the tread rotates.

Normal production methods employed in the manufacture of automobile and truck wheels involve the fabrication of a rim and disc secured together and manufactured from flat sheet steel. Rims are normally rolled while the disc is formed by a stamping operation and the holes are punched therethrough through a punching process. In all of these manufacturing steps, the inherent resiliency characteristics of the sheet steel normally produce both radial and lateral runout in the thusly formed components of the wheel.

To further accentuate the problem, the rim and disc are welded or riveted together to form the wheel. This can sum the already inherent lateral and radial runout as well as adding more radial and lateral runout to the wheel through distortion.

Lateral and radial runout will also normally be produced in the present production methods for tires because the positioning of the fabric utilized in the manufacture of the tires cannot be uniformly and totally controlled on the drum or in the placement of the tire in the matrix, and the normal expansion and contraction of the rubber during its curing process cannot be uniformly and totally controlled. Therefore, the presently used wheels and tires normally have both lateral and radial runout formed therein.

Since no particular attention is given to radial and lateral runout when the tire and the wheel are assembled, the assembly can have a radial and lateral runout of the sum of that produced by the manufacture of the wheel and that produced by the manufacture of the tire. Therefore, it is necessary to determine and eliminate the effects of both radial and lateral runout of the completed wheel and tire assembly for the desired operational performance thereof.

For special applications such as racing vehicles, the wheels formed have been machined in an attempt to eliminate the radial and lateral runout thereof or the wheel is prepared by machining a casting. This attempt was not only prohibitive costwise, but also failed to eliminate the radial and lateral runout of the tire.

SUMMARY OF THE INVENTION

These and other problems associated with prior art apparatus for stabilizing vehicular wheel and tire assemblies are overcome by the invention disclosed herein in that the radial runout and the results of lateral runout are measured and then the effects thereof substantially eliminated to stabilize the wheel and tire assembly as it rotates. The lateral runout itself is not eliminated, but the effect therof is eliminated by forming a tread which is substantially concentric about the rotational axis of the tire and wheel assembly. The apparatus for measuring the effect of the radial and lateral runout of the wheel and tire assembly also properly orients the cutting assembly for proper truing of the tire as well as indicating the amount of tread redefinition that must be performed to properly stabilize the tire and wheel assembly.

The method of the invention includes the step of rotating the wheel and tire assembly about its rotational axis while simultaneously determining the radial deviations of the tread with respect to this axis at two or more spaced points along an imaginary line extending across the tread parallel to the rotational axis and rotating about the circumference of the wheel and tire assembly; correlating the measurements thus taken to indicate the difference between the radial deviation determinations made as the imaginary line is rotated about the tread of the wheel and tire assembly; and subsequently cutting away selected portions of the tread to redefine the tread so that the effect of the lateral and radial runout is eliminated.

The apparatus of the invention includes generally an indicating mechanism, a cutting assembly, and a control unit which carries the indicator mechanism and the cutter assembly adjacent the wheel and tire assembly to be stabilized. The indicator mechanism includes a first indicator for measuring the radial runout along one edge of the tread of the wheel and tire assembly; another indicator for measuring the radial runout along the opposite edge of the tread; and means for correlating the indicators to indicate the difference in radial runout between the edges of the tread. The cutter assembly includes a cutter which redefines the tread in accordance with the indicator readings. The control unit includes a guide bar selectively adjustable to correspond to the curvature of the tread across its width for controlling the cutter assembly and is movable with respect the indicator mechanism to properly center the cutter assembly with respect to the tread of the wheel and tire assembly for the cutting operation.

These and other features and advantages of the invention will become more apparent upon consideration of the following specification and accompanying drawings wherein like characters of references designate corresponding parts throughout, and in which:

BRIEF DESCRIPTION OF THE DRAWINGS

FIG. 8 is a cross-sectional view taken along the line 8—8 in FIG. 5;

FIG. 9 is a cross-sectional view taken along the line 9—9 in FIG. 5;

FIG. 10 is a cross-sectional view showing the mechanism for adjusting the angularly positioned guide bar for controlling the cutter mechanism in response to that indicated by the indicator mechanism;

FIG. 11 is an enlarged top plan view of the cover plate showing the windows therein;

FIG. 12 is an enlarged top plan view of the indicators with the cover removed showing the indicia thereon;

FIG. 13 is a schematic wiring diagram for the indicator mechanism shown in FIG. 14;

FIG. 14 is a perspective view of an alternate embodiment of the indicator mechanism;

FIG. 15 is a schematic drawing showing radial runout;

FIG. 16 is a schematic drawing showing lateral runout;

FIG. 17 is a perspective view of another alternate embodiment of the indicator mechanism;

FIG. 18 is a top plan view of the indicator mechanism shown in FIG. 17; and

FIG. 19 is a cross-sectional view taken along the line 19—19 in FIG. 18.

These figures and the following detailed description disclose a specific embodiment of the invention; however, the inventive concept is not limited thereto since it may be embodied in other forms.

DESCRIPTION OF ILLUSTRATIVE EMBODIMENTS

Referring to the figures, it will be seen that the invention comprises generally an indicator mechanism M, a cutter assembly A, and a control unit U. The control unit U carries both the indicator mechanism M and the cutter assembly A and positions the same so that the indicator mechanism M can be utilized to measure the radial runout and the effect of lateral runout in a tire and wheel assembly and then the cutter assembly A moved into position to properly true the tire tread 13 for stabilizing the tire and wheel assembly TW, as it rolls along a surface.

Reference to FIG. 15 will indicate that radial runout is the deviation $d$ in the radius $R$ as the same is rotated about the tire and wheel assembly TW, and reference to FIG. 16 will show that the lateral runout is the displacement of the tread 13 from a plane perpendicular to its rotational axis. This forms the subtended angle. The effect of lateral runout, however, can be determined by measuring the absolute difference $d'$ between the radii to the tread 13 along an imaginary line extending transversely of the tread 13. It will be noted that at least two comparative measurements must be taken across the width of the tread in order that the effect of the lateral runout be detected.

The effect of lateral runout can be seen if a cylinder is not perpendicular to its rotational axis but is tilted slightly thereto as seen in FIG. 16. This causes one edge of the circumference of the cylinder to have a long radial dimension at $b$ and a short radial dimension at $c$ while the opposite edge of the circumference of the cylinder has a short radial dimension at $w$ and a long radial dimension at $z$ located diametrically opposite the corresponding points on the one edge. There, it will be seen that the axle (not shown) raised off the rolling surface rigidly attached to the tire and wheel assembly TW will be lifted at least twice each time the assembly TW rotates to cause a corresponding vibration to be set up in the axle.

The invention disclosed herein does not remove the lateral runout, but rather eliminates the effect thereof. The tread 13 is redefined to form a concentric surface rotatable about the rotational axis of the tire and wheel assembly TW. This serves to stabilize the assembly TW, its associated axle, and hence the vehicle.

Figure 1:
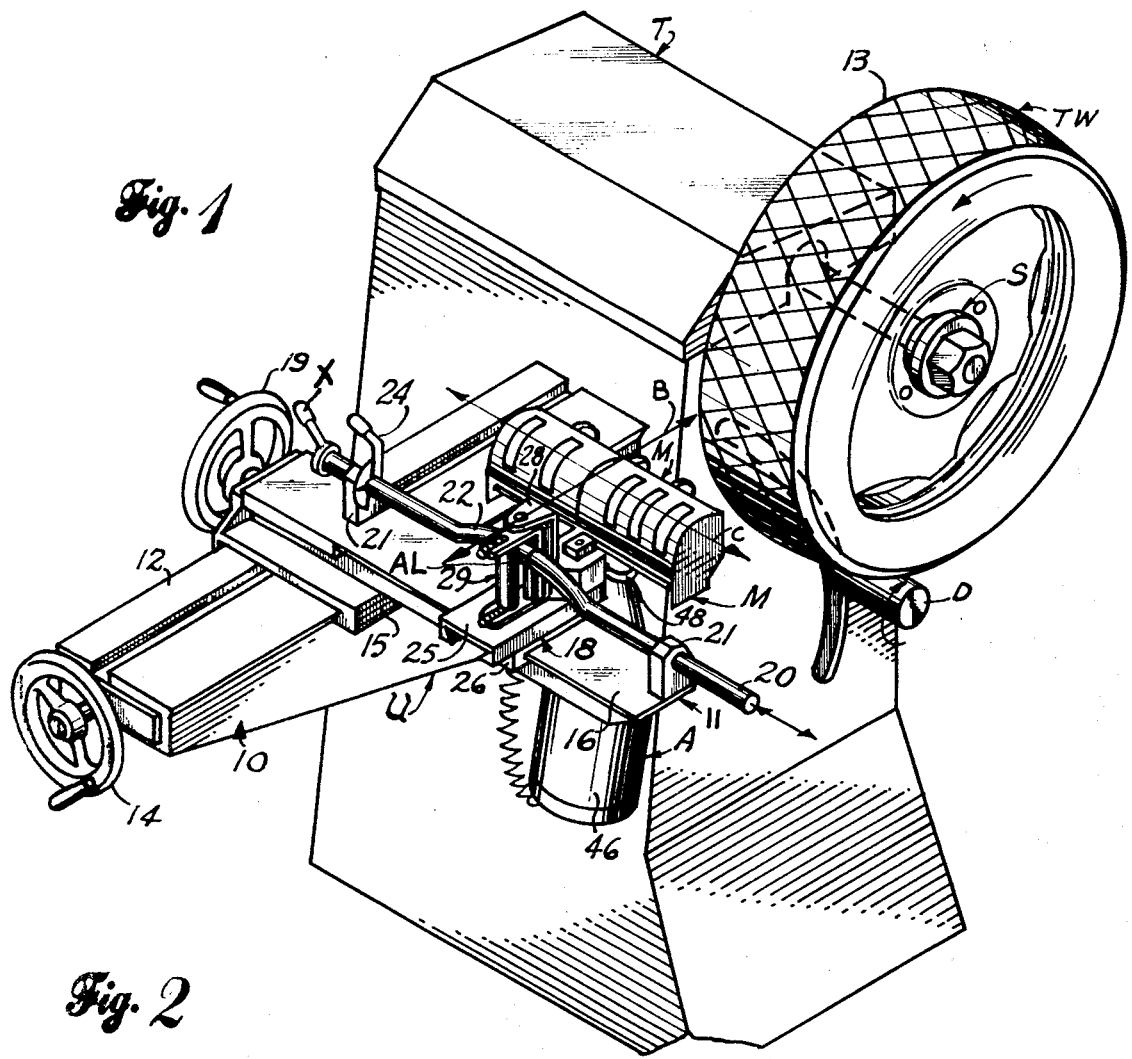
FIG. 1 is a perspective view of the invention positioned on a tire truing machine.

Referring to FIG. 1 it will be seen that the invention is mounted on a tire truing machine T wherein the tire and wheel assembly TW is mounted on a spindle S and driven by a driving roll D. The invention may be made as a separate unit for stabilizing a wheel and tire assembly while still mounted on the vehicle.

The control unit U is mounted on the truing machine T and includes a first adjustment means 10 for controlling the indicator mechanism M and cutter assembly A along the line of motion B perpendicular to the tire tread 13. Also included is a second adjustment means 11 which controls the position of the indicator mechanism M and the cutter assembly A along a line of motion C substantially parallel to the tire tread 13 of the tire and wheel assembly TW. The first adjustment means 10 includes a bed 12 along which the second adjustment means 11 is slidably carried and a conventional adjusting screw and hand wheel assembly 14 which is threadedly connected to the second adjustment means 11 in conventional manner to selectively move the second adjustment means 11 therealong as the hand wheel and screw assembly 14 is rotated.

The second adjustment means 11 is mounted on the bed 12 of the first adjustment means 10 through a saddle 15 and extends from the first adjustment means 10 substantially parallel to the tread 13 of the tire and wheel assembly TW. The second adjustment means 11 includes a bed 16 which mounts a carriage 18 thereon for slidable movement along the line of motion C. The carriage 18 mounts the indicator mechanism M and the cutter assembly A. A conventional adjusting screw with handwheel 19 extends along the length of the second adjustment means 11 and is threadedly connected to the carriage 18 to selectively move the carriage 18 back and forth along the carriage bed 16 in conventional manner.

A guide bar 20 is mounted on the bed 16 in spaced mounting brackets 21. The guide bar 20 is cylindrical in cross-section and has a semi-circular offset central portion 22 which controls the position of the carriage 18 transversely of the bed 16. One of the mounting brackets 21 is provided with a locking screw 24 which fixes the rotational and longitudinal position of the guide bar 20. The brackets 21 permit movement of the bar 20 longitudinally with respect to the bed 16 so that the semi-circular porition 22 of guide bar 20 can be centered by use of the handle X with respect to the tire and wheel assembly TW. The guide bar 20 is marked by an annular line AL at its center to assist in centering the semicircular portion 22 of the bar 20 as will be explained hereinafter.

Figure 2:
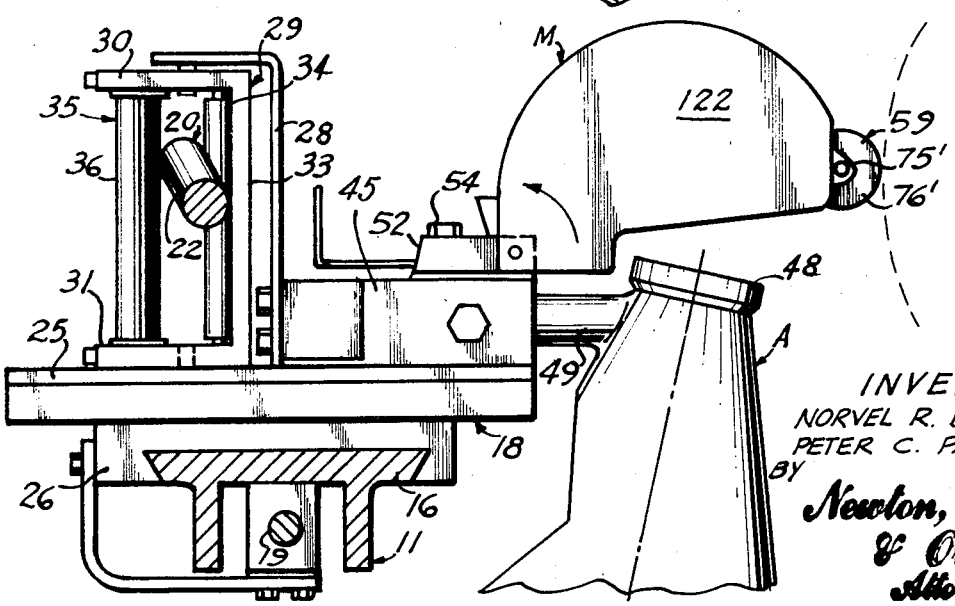
FIG. 2 is a side elevational view of the indicator mechanism and cutter assembly showing the relative relationship between the same.

The carriage 18 is provided with a slide plate 26 which slides longitudinally along the carriage bed 16 but does not move transversely thereof. A saddle 25 fits over the slide plate 26 so that the upper portion of the carriage 18 is selectively extendable transversely of the carriage bed 16. Referring to FIG. 2, the saddle 25 of the carriage 18 is provided with an upstanding pivot bracket 28. Pivotally mounted between the bracket 28 and the saddle 25 is a guide follower assembly 29.

Figure 3:
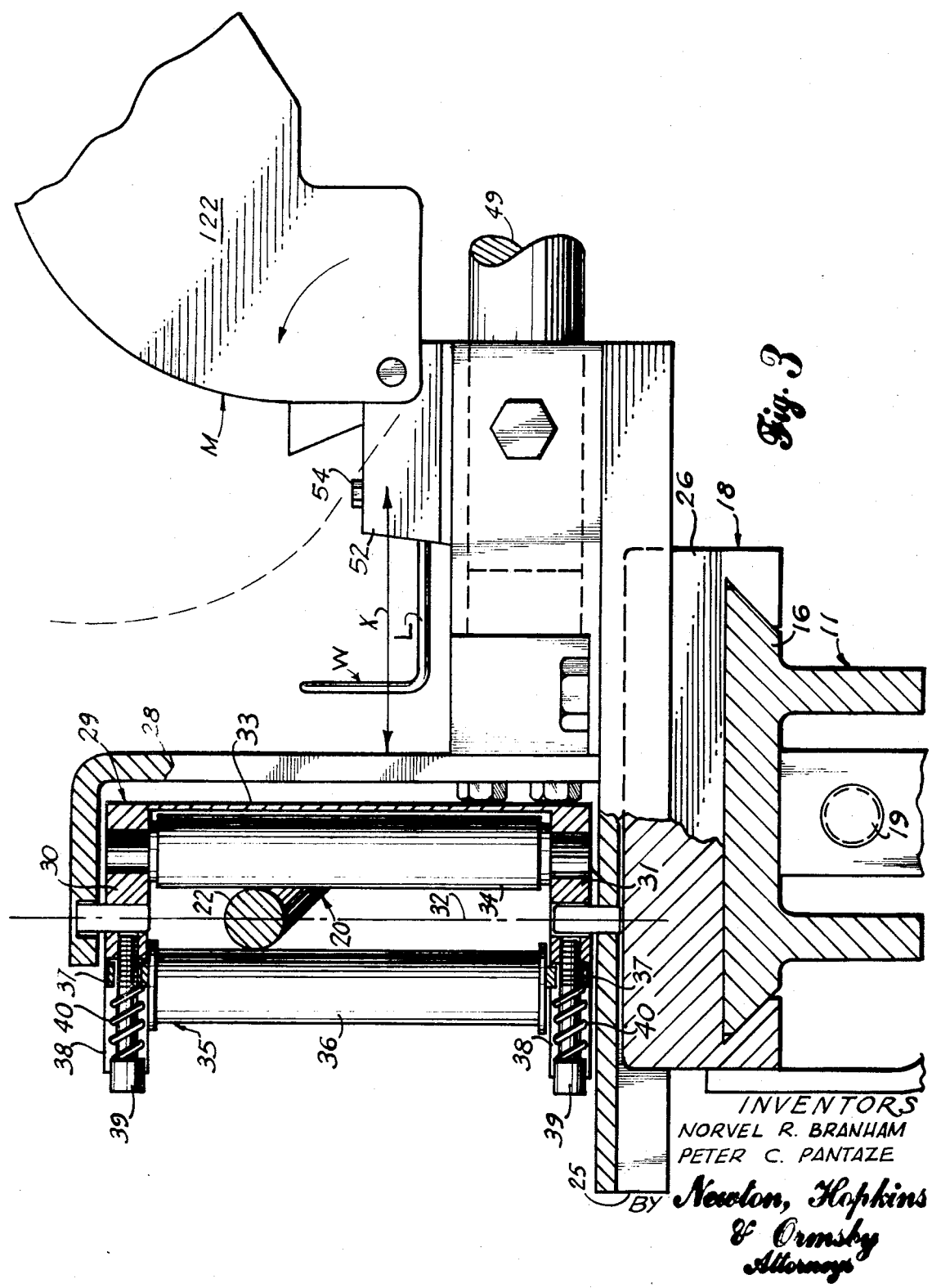
FIG. 3 is a cross-sectional view taken along the center of the control unit.
Figure 4:
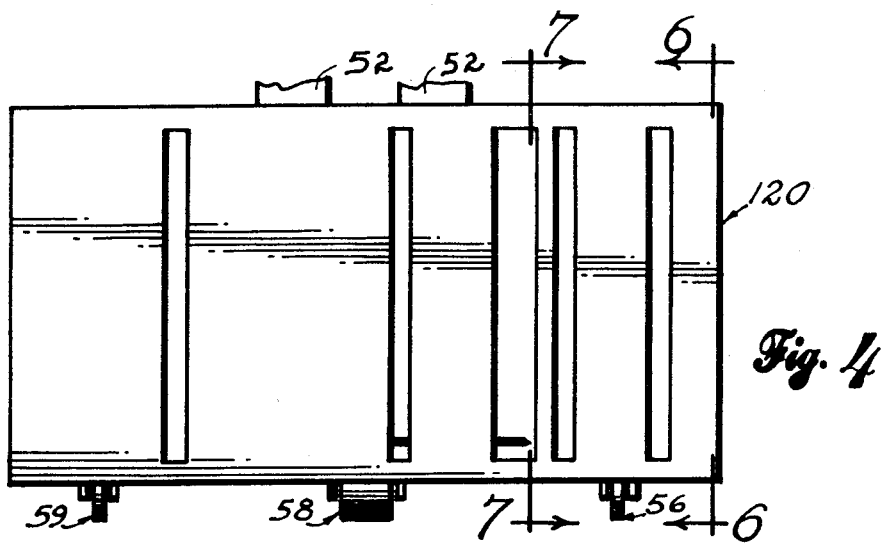
FIG. 4 is a top plan view of the indicator mechanism.

The guide follower assembly 29 as seen in FIG. 3 receives the guide bar 20 therethrough and serves to move the saddle 25 transversely of the bed 16 in response to the semi-circular portion 22 of the guide bar 20. The assembly 29 includes an upper horizontally oriented arm 30 rotatably carried by the pivot bracket 28 and spaced above the saddle 25. A lower horizontally oriented arm 31 is positioned under the upper arm 30 in vertical alignment therewith and is rotatably carried by the saddle 25. A vertical connecting plate 33 extends between and is integral with the forward ends of the arms 30 and 31 to maintain their alignment and vertical spacing.

A front guide roll 34 is carried between the upper and lower arms 30 and 31 adjacent the plate 33. The guide roll 34 is freely rotatable about a vertical axis and engages the guide bar 20.

An adjustable guide unit 35 is carried between the rear ends of the arms 30 and 31. The guide unit 35 includes a vertically oriented guide roll 36 parallel to the roll 34 and is rotatably mounted on an axle 37. The axle 37 extends above and below the roll 36 and is slidably received in slots 38 in the rear ends of the arms 30 and 31. The ends of the axle 37 extending into the slots 38 are slidably received over set screws 39 threadedly positioned in the slots 38. A spring 40 encircles each set screw 39 between the head thereof and the axle 37 so that the roll 36 is constantly urged forwardly toward the roll 34.

The rolls 34 and 36 receive the guide bar 20 therebetween to control the position of the saddle 25 as the carriage 18 moves along the bed 16. Since the arms 30 and 31 are pivoted about the common vertical axis 32, the entire unit comprised of the rolls 34 and 36 and the arms 30 and 31 can pivot to insure proper contact of the rolls 34 and 36 as the off-set portion 22 of the bar 20 is engaged.

Since the guide rolls 34 and 36 are always maintained parallel to each other and parallel to the vertical axis 32, the semi-circular portion 22 of the guide bar 20 may be selectively pivoted in the brackets 21 to define different arcs through which the guide rolls 34 and 36 will travel as the carriage 18 is moved along the length of the bed 16. Thus, the amount of extension and retraction of the slide 25 along the slide plate 26 as the carriage 18 is moved, is controlled by the semicircular bar 20.

As shown in FIGS. 1, 2 and 3, an indicator mechanism M and the cutter assembly A are mounted on the carriage 18 so that the mechanism M and assembly A are both moved toward and away from the tire and wheel assembly TW as the carriage 18 is moved back and forth along the line of motion C and the saddle 25 is moved toward and away from the tire and wheel assembly TW along the line of motion B in response to the semicircular portion 22 of the guide bar 20.

The cutter assembly A is of conventional design having a motor 46 and a cutter 48. The cutter assembly A is mounted on the carriage 18.

The indicator mechanism M is mounted on top of the carriage 18 by a mounting plate 52 attached to the block 45 through a plurality of bolts 54. The mounting plate 52 pivotally mounts the indicator mechanism M thereon as will be explained hereinafter.

As best seen in FIGS. 4-9, the first embodiment of the indicator mechanism M includes generally a support frame 55 which mounts a first indicator 56, a second indicator 58, and a third indicator 59 thereon. An adjustment mechanism 60 is carried by the support frame 55 and is operatively connected to the first indicator 56 and third indicator 59 to selectively adjust the spacing between the indicators 56, 58 and 59. It will be noted that the first indicator 56 is utilized to measure the radial deviations along one edge of the tire tread 13, that the second indicator 58 is utilized to measure the radial deviations along the center of the tire tread 13, and that the third indicator 59 is utilized to measure the radial deviations along the opposite edge of the tire tread 13. The indicator mechanism M is utilized by aligning the indicator 58 with the center of the tire tread 13 and selectively adjusting the adjusting the adjusting mechanism 60 until the indicator 56 is in alignment with one edge of the tread 13 and the indicator 59 is in alignment with the opposite edge of the tire tread 13. The guide bar 20 is then moved until the line AL is centered between the rolls 34 and 36 and locked in place by handle 24. This centers the bar 20 with respect to the tread 13. T The support frame 55 includes a horizontally oriented L-shaped beam 61 longitudinally extending across the indicator mechanism M and provided with upstanding end plates 62 at opposite ends thereof. The end plate 62 are provided at their rearmost corners with mounting apertures 64 through which a horizontal pivot shaft 65 extends. The pivot shaft 65 is supported at its central portion by a bearing block 66, as seen in FIGS. 8 and 9, fixedly carried by the L-shaped beam 61. The pivot shaft 65 is rotatably received through the forward portion of the mounting plate 52 so that the frame 55 carrying the indicators 56, 58, and 59 can be pivoted thereabout.

Figures 6, 7:
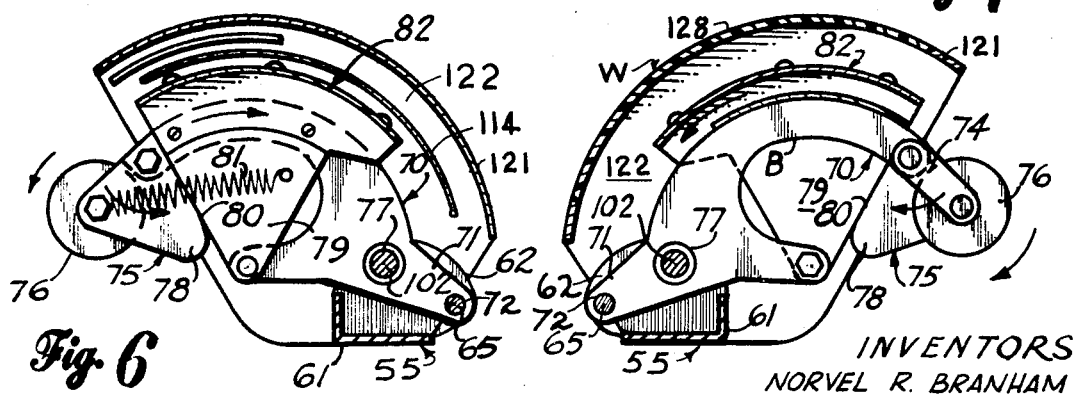
FIG. 6 is a cross-sectional view taken along the line 6—6 of FIGS. 4 and 5.
FIG. 7 is a cross-sectional view taken along the line 7—7 in FIGS. 4 and 5.

As best seen in FIGS. 6 and 7, the indicator 56 comprises generally a crescent shaped support bracket 70 having a rearwardly extending protrusion 71 integral therewith. The protrusion 71 defines an aperture 72 through its rearmost corner for pivotally mounting the bracket 70 on the pivot shaft 65 and is provided with a threaded sleeve 77 extending through the bracket 70 at the junction of the crescent B and the projection 71 and affixed thereto. The sleeve 77 is connected with the adjusting mechanism 60 to move the support bracket 70 along the shaft 65 while maintaining the support bracket 70 substantially perpendicular thereto. The forwardmost edge of the crescent shaped member 70 pivotally mounts a link 74 on the inside thereof and pivotally mounts a triangular cam 75 on the outside thereof. A wheel 76 is pivotally mounted between the forwardmost extending corner of the triangular cam 75 and the extending end of the link 74 for free rotational movement therebetween. Therefore it will be seen that the wheel 76, link 74 and cam 75 pivot with respect to the bracket 70 and the wheel 76 rotates with respect to the link 74 and cam 75.

The rearmost extending camming corner 78 of the cam 75 extends rearwardly toward the other end of the crescent B of the member 70. A carriage plate 79 having the shape of a sector of a circle is pivotally mounted at the other end of the crescent B of the member 70 whereby the front camming edge 80 thereof lies against the rearmost camming corner 78 of the triangular shaped cam 75. A spring 81 connected between the forwardmost extending corner of the triangular shaped cam 75 and the carriage plate 79 forces the cam 75 and the carriage plate 79 toward each other. A semicircular indicator plate 82 is attached along the outermost edge of the carriage plate 79 and extends substantially parallel to the axis about which the carriage plate 79 pivots. Therefore, it can be seen that as the wheel 76 is pivoted rearwardly, the camming corner 78 of the cam 75 forces the carriage plate 79 to pivot rearwardly or clockwise as seen in FIG. 6. This also moves the indicator plate 82 rearwardly. When the wheel 76 is not forced rearwardly, the spring 81 forces the carriage plate 79 forwardly or counterclockwise as seen in FIG. 6 and forces the wheel 76 forwardly again to its initial position.

The indicator 59 is substantially identical in construction to the indicator 56 and the corresponding parts thereof will be indicated by primes of the reference numerals applied to the components of the indicator 56.

As best seen in FIGS. 8 and 9, the indicator 58 comprises generally a pair of crescent shaped support brackets 90 integral with the bearing block 66 and extending upwardly therefrom between and in lateral alignment with the crescent shaped support brackets 70 and 70'. The support brackets 90 are spaced apart and parallel to each other. The brackets 90 each carry a backing plate 91 along the outer periphery thereof which are arcuate in shape. Pivoted to the forwardly extending end of the crescents C of the brackets 90 is an indicator wheel 92 rotatably mounted between links 94 pivoted on the outside of the forwardly extending ends of the crescents C. The wheel 92 is constantly urged forwardly by a spring 96 until the movement thereof is checked by the links 94 engaging the arcuate plates 91.

An indicator arm 98 is pivoted between the support brackets 90 at the rearmost end of the crescents C of the brackets 90 and is connected to the wheel 92 through a linkage 99 so that as the wheel 92 is moved rearwardly, the indicator arm 98 will also be pivoted rearwardly or clockwise in FIG. 8. The indicator arm 98 carries along the arcuate outer end thereof an arcuate indicator plate 100 which overlies the edges of the indicator plates 82 and 82' and the backing plates 91.

Figure 5:
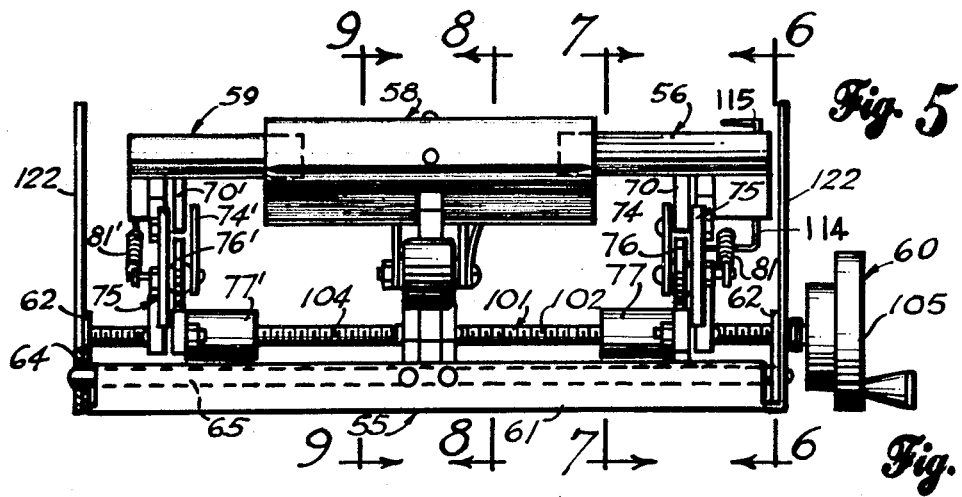
FIG. 5 is a front elevational view of the indicator mechanism with the cover removed.

The adjusting mechanism 60 includes a horizontal threaded shaft 101 as best seen in FIG. 5 rotatably mounted in the end plates 62 and the bearing block 66 and provided with a right hand threaded portion 102 on the right end thereof as seen in FIG. 5 and a left hand threaded portion 104 on the left end thereof as seen in FIG. 5. As the shaft 101 is rotated, the threaded sleeves 77 and 77' extending through the brackets 70 and 70' will be driven toward each other or away from each other simultaneously. In this manner, the wheel 92 always remains centered between the wheels 76 and 76'. A conventional handle 105 is provided on one end of the threaded shaft 101 extending through one of the end plates for rotating the same and adjusting the spacing between the indicators 56, 58 and 59. This allows the mechanism M to be used with tire and wheel assemblies TW of different tread widths.

As best seen in FIG. 12, the indicator plate 82 is provided with a radial deviation indicator line 110 and the indicator plate 82' is provided with a corresponding radial deviation indicator line 111. The indicator plate 100 is provided with a radial deviation indicator line 112. The indicator plate 82 is also provided with a plurality of tread curvature lines 113 which in combination with the radial deviation indicator line 112 on the indicator plate 100, indicate the pivotal setting of the guide bar 20 so that original tire tread shape can be maintained during the tire stabilizing operation.

To indicate the difference in radial deviation between that edge of the tread 13 associated with the indicator plate 82 that edge of the tread 13 associated with the indicator plate 82', an extension 114, as best seen in FIG. 12, is provided. The extension 114 is connected to the indicator plate 82' for movement therewith and extends across the interior mechanism M and over the indicator plate 82. A pointer 115 is provided which remains in alignment with the radial deivation indicator line 111 on the indicator plate 82' and overlies the radial deviation indicator line 110 on the indicator plate 82 to indicate the absolute deviation between the opposite edges of the tread 13 of the wheel and tire assembly TW.

A dial cover plate 120, as best seen in FIG. 11, is provided for the indicator mechanism M and includes an arcuate dial member 121 having depending end plates 122, as seen in FIG. 5, at each end thereof connected to the frame 55. The dial member 121 has the same curvature as the indicator plates 82, 82' and 100 overlies the same. A plurality of windows W are provided in the dial member 121 under which the radial deviation indicator lines 110, 111, and 112 and the pointer 115 move to indicate tread curvature, radial runout, and lateral runout.

One of the windows W referenced by the numeral 125 overlies a portion of the indicator plate 82 and also overlies the pointer 115 connected to the indicator plate 82'. the window 125, then, indicates the absolute difference between the radial runout of the edges of the tread 13 of the tire and wheel assembly TW. This measures the effect of the lateral runout of the tread 13. The window 125 is provided with appropriate indicia I to indicate the amount of lateral runout in the tire and wheel assembly TW.

A window 126 is spaced from the window 125 and overlies the indicator plate 82 with its radial deviation indicator line 110 so as to indicate the radial deviations or radial runout of that edge of the tread 13 associated with the indicator 56. The window 126 has appropriate indicia I thereon to indicate the amount of radial runout along that edge of the tread 13 associated with the indicator 56 as the tire and wheel assembly TW rotates by the indicator 56.

A window 128 overlies the junction of the indicator plate 100 and the indicator plate 82 to indicate the tread curvature of the tire and wheel assembly TW for setting the guide bar 20 and control the cutting of the tread 13. The window 128 is clear. The radial deviation indicator 112 on the indicator plate 100 moves with respect to the indicator plate 82 and overlies one of a plurality of the thread curvature lines 113 on the indicator plate 82 to indicate the angular setting of the guide bar 20.

A window 129 overlies the indicator plate 100 and its deviation indicator line 112 to indicate the radial deviations along the center of the tread 13. The window 129 has appropriate indicia I thereon just as the window 126 to indicate the amount of radial deviation or radial runout along the center of the tread 13.

A window 130 overlies the indicator plate 82' and is associated with the radial deviation indictor line 111 to indicate the radial deviations along that edge of the tread 13 associated with the indicator 59. Appropriate indicia I are provided on the window 130 to indicate the amount of radial runout associated with that edge of the tread 13 associated with the indicator 59.

The bottom of the L-shaped member 61 rests on the top of the mounting block 52 to properly position the indicator mechanism M for measuring the tire and wheel assembly TW. To insure that the indicator mechanism M will stay in this position, a U-shaped wire member W with its legs L slidably extending through appropriate holes H through the mounting bracket 52 is provided. The legs L slide through the mounting bracket 52 and just over the L-shaped member 61 of the frame 55 to lock it in position. When the legs L are retracted within the mounting bracket 52, the indicator mechanism M may be pivoted out from over the cutter assembly A so that the tire and wheel assembly TW may have its tread 13 redefined by the cutter 48 to stabilize the same while it rotates. When the indicator mechanism is in its down position for measuring the tire and wheel assembly TW, it serves as a protective cover for the cutter 48.

A positioning dial 140 as seen in FIG. 10 is mounted on one of the mounting brackets 21 adjacent the guide bar 20. The dial 140 has indicia 141 thereon corresponding to the numbering of the lines 113 on the indicator 56. A groove 142 is formed in the guide bar 20 and extends past the indicia 141 on the dial 140. The dial 140 and groove 142 are so arranged so that the tread curvature indicated by the indicators 56 and 58 will be retained when the corresponding setting is made between the dial 140 and the pointer 142. In other words, the nearer the offset portion 22 of the guide bar 20 is to the vertical the flatter the tread 13 will be across its width. In this manner, the original tread curvature of the tread 13 will be retained during the cutting operation.

SECOND EMBODIMENT

Referring to FIGS. 13 and 14, it will be seen that a second embodiment of the indicator mechanism M serves the same purpose as the first embodiment of the indicator M but measures tread curvature, radial runout, and the effect of lateral runout electronically. The indicator mechanism M' comprises generally a housing which is carried on the mounting block 45. The housing carries a first indicator 256, a second indicator 258 and the third indicator 259 therein. An adjusting mechanism 260 similar to the adjusting mechanism 60 of the first embodiment of the indicator mechanism M is provided for selectively spacing the indicators 256, 258 and 259 with respect to each other in the same manner as the indicators 56, 58 and 59 are spaced with respect to each other. This allows the indicator mechanism M' to be used with tires having different tread widths.

The indicators 256, 258 and 259 are sensing units commercially available on the market today to acurately determine the distance between an object and the indicator head. One type sensing head that will achieve this function is available under the name of Electro-Optical Systems and manufactured by Physitech, Inc. of Willow Grove, Pennsylvaina.

The indicator 256 is connected to a radial readout control unit 500, the indicator 258 is connected to a radial readout control unit 501, and the indicator 259 is connected to a radial readout control unit 502. The control units 500, 501 and 502 are connected in parallel to a voltage source 504 which supplies current thereto. The control unit 500 is connected to a radial readout meter 505, the control unit 501 is connected to a radial readout meter 506 and the control unit 502 is connected to a radial readout meter 508. It will be understood that the control units 500, 501 and 502 supply an output to the meters 505, 506 and 508 in response to the indicators to indicate the radial runout of the tread 13 adjacent each of the indicators 256, 258 and 259.

The indicators 256 and 259 are also connected to a conventional comparator 509 which is in turn connected to a lateral readout meter 510. The comparator 509 is operatively connected to the voltage source 504 in parallel with the control units 500, 501 and 502. It will be understood that the comparator 509 compares the output of the indicators 256 and 259 to indicate the maximum absolute difference in radial runout between the indicators 256 and 259 to give a lateral runout reading.

The indicators 256 and 258 are connected to another conventional comparator 511 which is in turn connected to a tire curvature meter 512. The comparator 511 is also connected to the voltage source 504 in parallel with the comparator 509 and the control units 500, 501 and 502. It will be understood that the comparator 511 compares the radial runout outputs from the indicators 256 and 258 to indicate the curvature of the tire across its tread.

THIRD EMBODIMENT

Referring to FIGS. 17 – 19, the third embodiment of the indicator mechanism M is indicated generally by the reference numeral M''. The indicator mechanism M'' is used in the same manner as the indicator mechanism M. The indicator mechanism M'' is pivotally mounted by mounting plate 52' and carried by the mounting block 45. A base plate 300 is included in the indicating mechanism M'' which is pivotally mounted between the upstanding ends of the mounting plate 52' by a pivot shaft 301 extending through the mounting plate 52' and the base member 300. The base member 300 defines a slide plate 302 thereon which extends along the line of motion B and which mounts thereon a saddle 304. The saddle 304 is urged forwardly by a spring 305 extending between the rear of the saddle 304 and the base member 300. An indicator wheel assembly 306 is pivotally mounted on the top of the saddle 304.

The indicator wheel assembly 306 includes a centrally located bearing plate 308 which mounts a pair of spaced parallel guide rods 309 thereon. The guide rods 309 extend outwardly from the right and left side of the bearing plate 308 as seen in FIG. 18 parallel to the line of motion C. An indicator arm 310 is carried on the right end of the guide rods 309 as seen in FIG. 18 and corresponding indicator arm 311 is carried on the left end of the guide rods 309 as seen in FIG. 18. The indicator arm 310 and 311 extend parallel to each other and parallel to line of motion B toward the wheel and tire assembly TW. Appropriate guide members not shown are provided on the indicator arms 310 and 311 to provide for the slidable movement thereof toward and away from the bearing plate 308 while remaining parallel to each other and parallel to the line of motion B.

An adjustment screw 314 is also rotatably mounted on top of the bearing plate 308 and extends outwardly therefrom to the right and to the left as seen in FIG. 18 to position the indicator arms 310 and 311. The adjustment screw 314 is provided with left hand threads 315 on the right side thereof as seen in FIG. 18 and with right hand threads 316 on the left side thereof as seen in FIG. 18. An appropriate handle 318 is provided on the extending end of the adjustment screw 314 for rotating the same. Appropriate threaded bosses 319 are provided on the indicator arms 310 and 311 which threadedly engage the threads 315 and 316 of the adjusting screw 314. As the handle 318 is rotated, the adjustment screw 314 simultaneously moves the indicator arms 310 and 311 toward each other or away from each other. An indicator wheel 320 is rotatably mounted in the forwardly extending end of the indicator arm 310 and an indicator wheel 321 is rotatably mounted in the forwardly extending end of the arm 311. The indicator wheels 320 and 321 rotate about a common axis and the adjusting mechanism 14 may be manipulated to move the indicator wheels 320 and 321 along the line of motion B until they contact the tread 13 of the tire and wheel assembly TW.

The indicator arms 310 and 311 and the bearing plate 308 may pivot about the pivot point 322 as best seen in FIG. 19. As the indicator wheels 320 and 321 engage the tread 13 of the tire and wheel assembly TW, and the tire and wheel assembly TW is rotated, the indicator wheels 320 and 321 will pivot the bearing plate 308 in accordance with the absolute difference $d'$ in radial deviation between the edges of the tread 13 along an imaginary line running transversely off the tread 13. This gives a direct reading of the effect of the lateral runout. An appropriate dial 324 is provided on the saddle 304 and a pointer 325 is provided on the forwardly extending end of the bearing plate 308 so that the amount of lateral runout will be indicated directly as the tire and wheel assembly TW is rotated.

For determining the radial deviations or radial runout of the tread 13, an indicator strip 326 having indicia I thereon is provided along the upper surface of the base member 300 adjacent the front edge 329 of the saddle 304. By moving the indicator wheels 320 and 321 along the line of motion B until the saddle 304 is zeroed on the indicator strip 326, the spring 305 will maintain the indicator wheels 320 and 321 against the tire tread 13 as the same rotates thereby. The spring 305 forces the saddle 304 to move back and forth in accordance with the radial deviations $d$ in the tread 13. The operator then, can directly read the amount of radial runout in the tread 13. This embodiment of the indicator mechanism reduces the components thereof to an absolute minimum while still giving all of the necessary indicia to determine the effect of radial and lateral runout of the tire and wheel assembly TW.

OPERATION

In the operation of the invention, it will be seen that a tire and wheel assembly TW is removed from the vehicle and placed on the spindle S of the truing machine T. The driving roll D is moved up against the tread 13 of the tire and wheel assembly TW for selectively rotating the same. Usually, these tire truing machines have a first speed for rotating the driving roll D and the tire and wheel assembly TW for checking the irregularities in the tread 13 and a second speed for rotating the turning wheel assembly TW during the cutting operation with the cutter assembly A. The first speed is relatively slow whereas the second speed is much faster for the cutting operation.

When the first embodiment of the indicator mechanism M is used, the mechanism M is pivoted to its down position so that it overlies the cutter 48 of the cutter assembly A and the wire member W is moved so as to lock the mechanism M in this down position. The locking screw 24 in the mounting bracket 21 is manipulated so as to release the guide bar 20 for slidable movement of the guide bar 20 along its length as well as pivoting about its centerline. The adjustment wheel and screw assemblies 14 and 19 are manipulated until the wheel 92 of the indicator 58 is approximately centered on the tread 13 of the tire and wheel assembly TW mounted on the spindle S.

The handle 105 of the indicator mechanism M is then manipulated along with the wheel and screw assembly 19 until the indicator wheels 76 and 76' rest on opposite edges of the tread 13. This centers the indicator mechanism M with respect to the tire and wheel assembly TW. The adjustment wheel and screw assembly is then manipulated to move the indicator mechanism M toward the tread 13 until the indicator line 110 of the indicator 56 is zeroed under the window 125 in the cover 120. This gives a fixed point from which the readings on the indicator mechanism M are made.

The tire tread 13 is slowly rotated in contact with the indicator mechanism M. As the tire wheel assembly TW is rotated, the indicator wheels 76, 76' and 92 are moved in response to the varying radius between the center of rotation of the tire and wheel assembly TW and the tread 13. This causes the cams 75 and 75' to engage and move the carriage plates 79 and 79' in response to the pivotal movement of the wheels 76 and 76' and the links 74. As the carriage plates 79 and 79' are moved, the indicator lines 110 and 111 are moved under their associated windows W. It will also be noted that the pointer 115 will be moved along over the indicator plate 82 as the indicator plate 82' is moved.

In like manner, it will be seen that the indicator arm 98 of the indicator 58 is moved in response to the pivotal movement of the wheel 92 and links 94 through the linkage 99. This moves the indicator plate 100 with its associated indicator line 112 under the cover 120.

The operator watches the movement of the indicator lines 110, 111, and 112 as well as the movement of pointer 115, as the thread 13 is slowly rotating in contact with the indicators 56, 58 and 59. The operator notes the maximum difference between the indications represented by the indicator line 112 and the pointer 115 to determine the amount of tread re-definition that is necessary to remove the radial runout and the effect of lateral runout. The operator also notes the amount of radial runout associated with each indicator 56, 58 and 59 to determine the amount of tread of re-definition that is necessary to remove the effect of radial runout. The operator will also note which one of the curvature lines 113 is indicated by the indicator line 112 under the window 128. This indicates to the operator the rotational position at which he must set the guide bar 20 to re-define the tread so that the same tread curvature across the width of the tread is retained.

After the operator has made these determinations, he moves the guide bar 20 longitudinally along its center line and parallel to the line of motion C until the line AL described on guide bar 20 is centered between the rolls 34 and 36. This insures that the cutter assembly A will redesign the tread 13 symmetrically across its width during the cutting operation. The operator then pivots the guide bar 20 about its center line until the pointer 122 adjacent the positioning dial 140 lies over the indicia 141 indicated by the indicator line 112 under the window 128. This insures that the cutter assembly A will be moved in response to the off-set portion 22 of the guide bar 20 during the cutting operation to redefine the tread 13 with the same curvature across its width as the original tread had.

The operator then moves the wire member W so as to release the indicator mechanism M for pivoting, pivots the indicator mechanism M up out of the way and manipulates the adjusting wheel and screw assembly 14 to move the cutter assembly A into contact with the tread 13. The motor 46 of the cutter assembly A is energized to rotate the cutter 48, and the adjusting wheel and screw assembly 19 is manipulated to move the cutter assembly A across the tread 13 to re-define the same. It is possible for the operator to further manipulate the adjusting wheel and screw assembly 14 to move the cutter assembly A further toward the center of rotation of the tread 13 to remove a sufficient amount of rubber from the tread 13 to re-define the same to form a substantially perfect cylinder about the axis of rotation of the tire and wheel assembly TW.

After the tread 13 has been re-defined, the operator retracts the cutter assembly A away from the tread 13 by manipulating the wheel and screw assembly 14, removes the tire and wheel assembly TW from the spindle S and re-installs the same on the vehicle. The wheel and tire assembly TW is now stabilized for rotation about its effective rotational axis.

In using the second embodiment of the indicator mechanism designated as M', it will be seen that the operator mounts the tire and wheel assembly Tw in the same manner, pivots the indicator mechanism M' to its down position as was done with the first embodiment of the indicator mechanism M and moves the indicator mechanism M' into close proximity with the tread 13.

The basic difference between the indicator mechanism M and the indicator mechanism M' is that it is not necessary for the indicator mechanism M' to actually contact the tread 13 to measure the effect of radial and lateral runout as well as tread curvature across its width. The adjustment mechanism 260 of the indicator mechanism M' is manipulated to properly adjust the spacing between the indicators 256, 258 and 259 similarly to the adjustment of the indicators 56, 58 and 59 by the handle 105 of the adjustment mechanism 60. The operator zeros the indicator mechanism M' by manipulating the adjustment wheel and screw assembly 14 until the radial readout meter 505 is zeroed. This gives a reference point from which to work with the indicator mechanism M'.

The operator then watches the meters 505, 506, 508, 510 and 512 to determine the curvature of the tread across its width to set the guide bar 20, the amount of tread re-definition necessary to correct the effects of lateral runout, and the amount of tread re-definition necessary to correct the effects of radial runout. The tire and wheel asselbly TW is then rotated in the aforementioned manner, the guide bar 20 set in the same way, and the tread 13 redefined in the same way as with the first embodiment of the indicator mechanism M.

The third embodiment of the indicator mechanism M'' is used in substantially the same manner as the first embodiment thereof. In this embodiment of the indicator mechanism M'', there is no middle indicator so that the handle 318 is manipulated to properly space the indicator wheels 320 and 321 along each edge of the tread and then the indicator M'' is moved up against the tread 13 using the wheel and screw assemblies 14 and 19. The indicator mechanism M'' is so moved until the front edge 328 of the plate 304 is zeroed on the indicia I of the indicator strip 328.

The operator then notes the amount of deviation at any opposite points along the tread 13 as the tire and wheel assembly TW is rotated to indicate the amount of rubber that must be removed from the tire and wheel assembly TW to re-define the tread 13. Reference to the indicator strip 328 will also tell the operator the amount of radial deviation along the tread 13.

It will be noted that the third embodiment of the indicator mechanism M'' does not indicate the setting of the guide bar 20 to re-define the tread curvature 13 across its width. This is done using a set of templates.

While specific embodiments of the invention have been disclosed herein, it is to be understood that modifications, substitutions and equivalents may be used without departing from the scope of the invention as set forth by the appended claims.

We claim:

1. A method of stabilizing a vehicular wheel and tire assembly rotatable about an axis and having a circumferential tread which rolls along a surface comprising the steps of:
   a. rotating said tire and wheel assembly about said axis while simultaneously determining the radial deviations at least at two axial spaced points along a common line extending across said tread;
   b. correlating the determinations thus taken to indicate the maximum absolute difference between any two radial deviations thus taken along said line; and,
   c. subsequently cutting away selected portions of said tread so that said maximum absolute difference is not greater than a predetermined amount.

2. The method of claim 1 wherein said predetermined amount is substantially zero.

3. The method of claim 2 further including the step of determining the curvature of said tread and wherein the step of cutting away selected portions of said tread includes redefining a tread having the same curvature as said original tread.

4. The method of claim 2 wherein said determination of said radial deviations is performed mechanically.

5. The method of claim 2 wherein said determinations of said radial deviations is performed electronically.

6. Apparatus for stabilizing a vehicular wheel and tire assembly rotatable about an axis and having a circumferential tread which rolls along a surface including:
   a. support means for mounting and rotating said wheel and tire assembly about said axis;
   b. indicator means adjustably carried by said support means adjacent the tread, said indicator means constructed and arranged to simultaneously measure the radial deviations in the tread at least at two axial spaced points along a common line extending across said tread as the tread is rotated; and, c. cutter means adjustably carried by said support means for cutting away selected portions of the tread.

7. The apparatus of claim 6 further including guide means for controlling the movement of said cutting means.

8. The apparatus of claim 6 wherein said indicator means includes:
 a. a first indicator engaging said tread;
 b. a second indicator spaced from said first indicator, aligned with said first indicator, and engaging said tread as said tread is rotated; and,
 c. adjusting means for selectively varying the spacing between said first and second indicators.

9. The apparatus of claim 8 further including means connecting said first and second indicators for correlating the measurements taken by each to indicate the maximum absolute difference between the measurements.

10. The apparatus of claim 8 further including a third indicator engaging said tread as said tread is rotated and aligned with said first and second indicators, and wherein, said adjusting means maintains said third indicator centered between said first and second indicators.

11. The apparatus of claim 8 wherein said indicator means includes:
 a base plate pivotally mounted on said support means;
 a saddle slideably mounted on said base plate, means for urging said saddle toward said tread along a first line of motion;
 a bearing plate pivotally mounted on said saddle about an axis perpendicular to said line of motion;
 said first indicator being carried by said bearing plate and including:
 a first arm adjustably carried by said bearing plate and extending toward said tread, said arm being moveable with said bearing plate, and
 a wheel rotatably mounted on said first arm at that end extending toward said tread;
 said second indicator being carried by said bearing plate and including:
 a second arm adjustably carried by said bearing plate parallel to and aligned with said first arm, said second arm being moveable with said bearing plate, and
 a second wheel rotatably mounted on said second arm at the end extending toward said tread.

12. The apparatus of claim 8 wherein said indicator means includes:
 a support frame pivotally mounted on said support means,
 said first indicator being carried by said support frame and including:
 a first support bracket mounted on said support frame and extending toward said tread,
 link means pivotally mounted at one end thereof on the end of said first bracket extending toward said tread,
 a wheel rotatably mounted on the other end of said link means,
 camming means carried by said link means and moveable therewith,
 a carriage plate pivotally mounted on said first bracket and engaged by said camming means for pivoting said carriage plate as said link means is moved, and
 resilient means for urging said camming means into engagement with said carriage plate and for urging said wheel toward said tread;
 said second indicator being carried by said support frame and including:
 a second support bracket mounted on said support frame and extending toward said tread,
 link means pivotally mounted at one end thereof on the end of said second bracket extending toward said tread,
 a second wheel rotatably mounted on the other end of said link means,
 camming means carried by said link means and moveable therewith,
 a carriage plate pivotally mounted on said second bracket and engaged by said camming means for pivoting said carriage plate as said link means is moved, and
 resilient means for urging said camming means into engagement with said carriage plate and for urging said wheel toward said tread.

* * * * *